(12) United States Patent
Christos

(10) Patent No.: US 6,942,119 B2
(45) Date of Patent: Sep. 13, 2005

(54) COVER FOR A COOKING CONTAINER AND METHOD OF USING

(76) Inventor: John Louis Christos, 1609 Woodbine Dr., Valparaiso, IN (US) 46383

( * ) Notice: Subject to any disclaimer, the term of this patent is extended or adjusted under 35 U.S.C. 154(b) by 148 days.

(21) Appl. No.: 10/249,869

(22) Filed: May 14, 2003

(65) Prior Publication Data

US 2004/0226952 A1 Nov. 18, 2004

(51) Int. Cl.⁷ ............................................. B65D 51/16
(52) U.S. Cl. .................................... 220/368; 126/380.1
(58) Field of Search .............................. 220/368, 573.1, 220/367.1, 369, 912; 126/380.1, 381.1, 382.1, 384.1

(56) References Cited

U.S. PATENT DOCUMENTS

| | | | | |
|---|---|---|---|---|
| 53,421 | A | * 3/1866 | Dembois | .................. 126/384.1 |
| 504,243 | A | * 8/1893 | Philippot | .................. 126/384.1 |
| D26,706 | S | 3/1897 | Eagle | |
| 1,002,004 | A | * 8/1911 | Skiba | ...................... 126/384.1 |
| 1,676,146 | A | 7/1928 | Krafft | |
| 1,777,743 | A | * 10/1930 | Blenz | ...................... 126/384.1 |
| 2,127,988 | A | * 8/1938 | Tarrant | .................... 126/384.1 |
| 3,596,590 | A | 8/1971 | Harris | ........................ 99/345 |
| 3,598,105 | A | 8/1971 | Cristaldi | .................... 126/381 |
| 3,744,400 | A | 7/1973 | Woodruff | ...................... 99/345 |
| 3,809,064 | A | 5/1974 | Ziegler | ....................... 126/381 |
| 3,937,210 | A | 2/1976 | Kachaylo | ..................... 126/384 |
| D246,627 | S | 12/1977 | Sugiyama | ..................... D7/85 |
| 4,075,939 | A | 2/1978 | Horn et al. | ................... 99/345 |
| 4,358,992 | A | 11/1982 | Behnisch | ...................... 99/345 |
| 4,700,689 | A | 10/1987 | Speker | ........................ 126/384 |
| D293,192 | S | 12/1987 | Baggioli | ...................... D7/354 |
| 4,759,342 | A | 7/1988 | Lee et al. | .................... 126/381 |
| 4,828,140 | A | 5/1989 | Henderson | .................. 220/369 |
| 5,423,247 | A | 6/1995 | Rodrigues-Ely | ............. 99/401 |
| D444,665 | S | 7/2001 | Maier | .......................... D7/359 |

\* cited by examiner

Primary Examiner—Lien M. Ngo
(74) Attorney, Agent, or Firm—Gary M. Hartman; Domenica N.S. Hartman; Hartman & Hartman

(57) ABSTRACT

A cover for a cooking implement, such as a grill, and a method of using such a cover in order to assist in the cooking of food with steam. The cover comprises a raised portion and a reservoir adjacent the raised portion. The reservoir has first and second walls and a bottom therebetween so as to be capable of containing a liquid. The reservoir further has at least one drain hole located below an upper fill level of the reservoir, and the raised portion has at least one vent hole located above the upper fill level. The drain and vent holes are relatively sized so that a liquid contained within the reservoir flows through and exits the drain hole in the form of droplets, which vaporize substantially immediately once outside the drain hole.

20 Claims, 1 Drawing Sheet

COVER FOR A COOKING CONTAINER AND METHOD OF USING

BACKGROUND OF INVENTION

1. Field of the Invention

The present invention generally relates to cooking equipment and methods. More particularly, this invention relates to a cover for a cooking implement, such as a grill, in which the cover is configured to assist in the cooking of food with steam.

2. Description of the Related Art

It is known to moisturize meat and other foods during the cooking process by retaining or introducing water into the cooking container in which the food is being heated. For this purpose, pans and pan lids have been proposed that have drain holes for dispensing water into the pan. For example, U.S. Pat. No. 1,676,146 to Krafft discloses a two-piece cover for a pot, with an inner (lower) cover defining an annular-shaped trough or reservoir with bottom drain holes and a screen or openings for venting vapor in conjunction with vent holes in an outer (upper) cover. The reservoir accumulates water from steam that condenses during cooking, and the drain holes allow free passage of the water back into the pot. Another example is U.S. Pat. No. 3,809,064 to Ziegler, which discloses a cooking vessel with a cover that has an annular-shaped trough with bottom drain holes. The cover also has openings through which boiling ("foaming") liquid overflows into the trough, and a cap with holes for venting steam. Foaming liquid that overflows through the openings and into the trough is freely returned to the vessel through the drain holes.

Other lid configurations are particularly adapted to permit the user to add water or another desired liquid during the cooking process. For example, U.S. Pat. No. 3,596,590 to Harris discloses a skillet with a cover having a central reservoir and a spring-loaded valve for allowing water, etc., to flow freely through a passage into the skillet. Another example is U.S. Pat. No. 3,598,105 to Cristaldi, which discloses a cover having an annular-shaped reservoir (groove) defined by a curved wall and a perpendicular wall, the latter of which is equipped with drain holes that permit unrestricted flow of water from the reservoir into the vessel on which the cover is placed. Finally, U.S. Des. Pat. No. D26,706 to Eagle discloses a cover with a central crown region surrounded by an annular-shaped trough. An upper set of perforations is formed in the crown region, while a lower set of perforations is located within the trough. While not discussed, it would appear that any fluid placed in the trough would flow freely through the lower perforations back into a pan on which the cover is placed.

The above patents do not disclose or suggest the capability of controllably metering the flow of water into a cooking container. In contrast, U.S. Pat. No. 3,744,400 to Woodruff discloses a lid equipped with a tank serving as a reservoir for water, wine, etc. The tank is secured to the lid with a bolt within which there is formed a passage, and through which liquid drains from the tank into a pan on which the lid is place. The bolt is equipped with a small bore fitted with a screw for metering flow from the tank to the pan. U.S. Pat. No. 4,075,939 to Horn et al. discloses a container with a cover equipped with a porous material through which water, etc., can be gradually delivered to the interior of the container.

In view of the above, though lids and covers have been proposed that are capable of regulating the flow of water, etc., into a cooking container, the manner in which flow is regulated requires the use of one or more additional components, e.g., a metering screw (e.g., Woodruff) or a porous material (Horn et al.). It would be desirable if water (and other liquids used to moisturize foods during cooking) could be introduced into a cooking container without the necessity for such additional components. It would further be desirable if this capability were available for use with grills, which have the known propensity to dry meat during cooking.

SUMMARY OF INVENTION

The present invention provides a cover for a cooking implement, such as a grill, and a method of using such a cover in order to assist in the cooking of food with steam. The cover comprises a raised portion and a reservoir adjacent the raised portion. The reservoir has first and second walls, at least one of which is configured to establish an upper fill level for a liquid contained by the reservoir. The reservoir further has at least one drain hole located below the upper fill level, and the raised portion has at least one vent hole located above the upper fill level. According to one aspect of the invention, the drain and vent holes are relatively sized so that a liquid contained within the reservoir flows from the reservoir through the drain hole and exits the drain hole in the form of droplets. According to another aspect of the invention, the drain and vent holes are relatively sized so that the flow of the liquid is metered at a rate that allows the droplets to be of a sufficiently small size so as to vaporize substantially immediately once outside the drain hole.

In view of the above, the method of the present invention makes use of a cover comprising a raised portion and a reservoir capable of containing a liquid, wherein the reservoir is configured to have a maximum fill level and at least one drain hole located below the maximum fill level, and the raised portion has at least one vent hole located above the maximum fill level. The method involves heating the cooking chamber and then placing a liquid in the reservoir, wherein the liquid contained within the reservoir flows from the reservoir through the drain hole and enters the cooking chamber in the form of droplets that vaporize substantially immediately as a result of the relative sizing of the drain and vent holes.

In view of the above, it can be seen that a significant advantage of the present invention is that moisture can be introduced at a controlled rate through one or more drain holes that are located and sized in relation to one or more vent holes, such that the drain and vent holes cooperate to meter the flow of liquid from the reservoir. This capability is not dependent on additional components that must be assembled with the cover, such that the cover of this invention has the capability of being relatively inexpensive and easy to manufacture.

Other objects and advantages of this invention will be better appreciated from the following detailed description.

DETAILED DESCRIPTION

Figure 1:
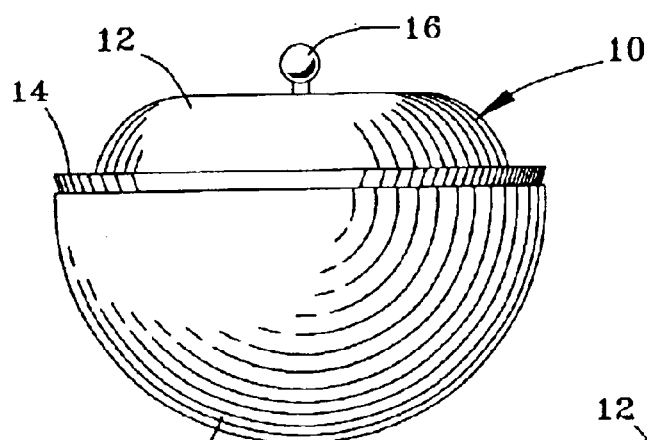
FIG. 1 is a side view of a cover on a grill, wherein the cover is configured in accordance with an embodiment of this invention.
Figure 2:
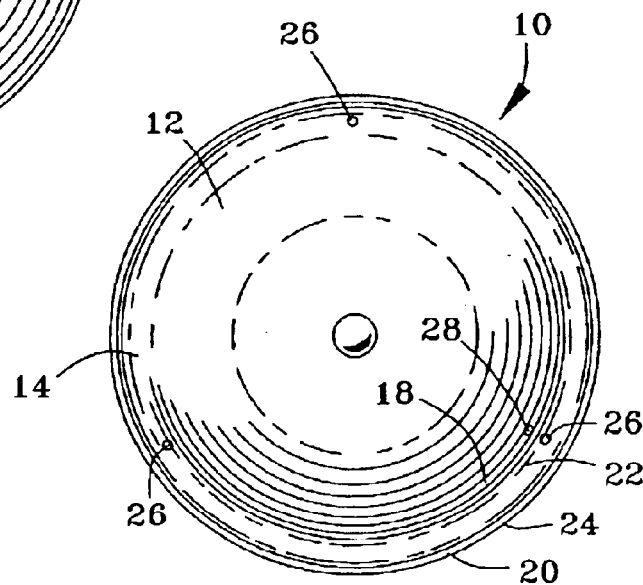
FIGS. 2 and 3 are top and bottom views, respectively, of the cover of FIG. 1.

FIGS. 1 through 5 show a cover 10 for a cooking implement, represented as a grill 11 in FIG. 1. As used herein, the term "grill" is intended to denote a flat surface on which food can be directly cooked, and therefore also encompasses flat cooking pans. The cover 10 is depicted as being configured to assemble with the grill 11 (or other cooking implement) that, with the cover 10, defines an enclosed cooking chamber having a circular shape in the horizontal plane. However, the cover 10 is not limited to this shape, and variations in geometry beyond that depicted in the Figures are within the scope of this invention. Suitable materials for the cover 10 include a stainless steel, such as an AISI 300 series steel, with a thickness of about one millimeter, though the cover 10 could be formed from other materials and have a lesser or greater thickness.

Figure 5:
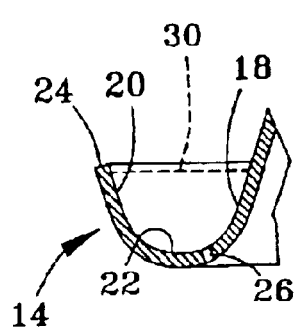
FIG. 5 is a detailed cross-sectional view of the cover taken from FIG. 4.

The cover 10 is shown as comprising a central raised portion 12 and a peripheral portion that defines an annular-shaped reservoir 14 that completely surrounds the raised portion 12. While the reservoir 14 is shown as being continuous around the raised portion 12 and at the perimeter of the cover 10, these are preferred but not necessary for the success of the invention. A knob 16 is centrally located on the raised portion 12 to facilitate removal of the cover 10 from the grill 11 when the cover 10 is hot. As most readily seen in FIGS. 4 and 5, the reservoir 14 is defined by an arcuate radially-inward wall 18, an arcuate radially-outward wall 20, and a bottom wall 22 therebetween, essentially defining a U-shaped channel that is capable of containing a liquid, such as water or another liquid desired to moisturize and possibly flavor the particular food being cooked on the grill 11. The outward wall 20 terminates in a lip 24 that is at a lower elevation than the raised portion 12, such that the lip 24 establishes the upper (maximum) fill level 30 of the reservoir 14 (FIG. 5).

Figure 3:
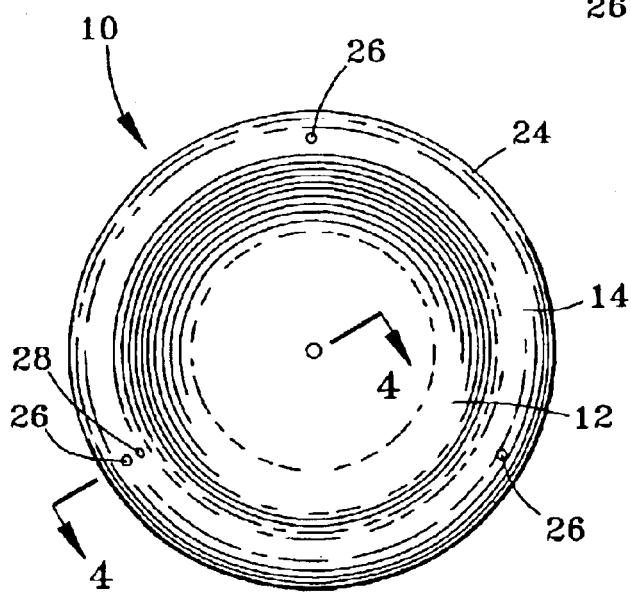
Figure 4:
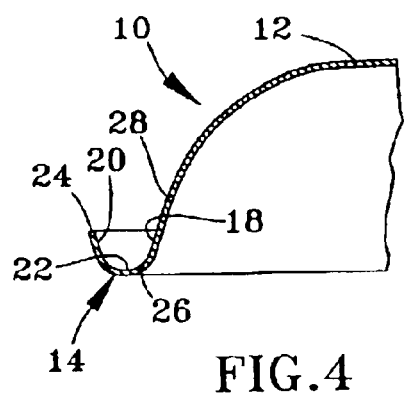
FIG. 4 is a fragmentary cross-sectional view of the cover along line 4B4 in FIG. 3.

As seen in FIGS. 1 and 3, the reservoir 14 is formed to have three drain holes 26 equiangularly spaced apart and located in the inward wall 18 between the bottom wall 22 and the upper fill level 30. As indicated in FIG. 5, a preferred location for each drain hole 26 is about twenty-five degrees from a vertical to the reservoir 13. Located adjacent one of the drain holes 26 is a vent hole 28, located in the raised portion 12 so as to be above the upper fill level 30 of the reservoir 14. At this location, the vent hole 28 is not located at the apex of the raised portion 12, but instead is located roughly one-half the vertical distance between the lower and upper extremities of that portion of the cooking chamber within the cover 10.

In use, steam is introduced into the cooking chamber defined by the cover 10 and grill 11 by simply heating the cooking chamber (e.g., burning charcoal) to an appropriate temperature, e.g., about 375Â° F. (about 190Â° C.), and then placing a liquid in the reservoir 14. Through the cooperation of the drain and vent holes 26 and 28, the liquid begins to flow through the drain holes 26, forming fine droplets that vaporize within the cooking chamber to form steam. According to a preferred aspect of the invention, the drain and vent holes 26 and 28 are relatively sized and located on the cover 12 so that the droplets of liquid are sufficiently small and form at a rate that enables the droplets to vaporize substantially immediately as they leave the drain holes 26. In practice, three drain holes 26 having diameters of about 0.9 to 1.1 mm in combination with a single vent hole 28 having a diameter of about one millimeter have been shown to be effective together, though it is foreseeable that drain and vent holes 26 and 28 differing in number and/or size could also be effective.

While not wishing to be held to any particular theory, it is believed that heat escapes through the vent hole 28 at a rate that creates a sufficient vacuum to draw the liquid from the reservoir 14 through the drain holes 26. In the absence of the vent hole 28, it has been found that water will not flow through drain holes 26 having diameters of about 1.0 mm and located as shown in the Figures. Simply increasing the size of the drain holes 26 yields unsatisfactory results, in that the water tends to drain out too quickly, producing excessive steam that escapes along the perimeter of the cover 10. Accordingly, the presence of the vent hole 28 is important, as is the proper sizing the holes 26 and 28. It is also believed that locating the drain holes 26 off the bottom wall 22 of the reservoir 14 is important. Finally, the vent hole 28 is preferably located on the cover 10 away from the knob 16 so that steam vented through the hole 28 does not heat the knob 16.

While the invention has been described in terms of a preferred embodiment, it is apparent that other forms could be adopted by one skilled in the art. Therefore, the scope of the invention is to be limited only by the following claims.

What is claimed is:

1. A grill cover comprising:

a raised portion;

a reservoir adjacent the raised portion, the reservoir having first and second walls, at least one of the first and second walls being configured to establish an upper fill level for a liquid contained in the reservoir;

at least one drain hole located in the reservoir below the upper fill level thereof; and at least one vent hole located in the raised portion above the upper fill level;

wherein the drain and vent holes are relatively sized so that a liquid contained within the reservoir flows from the reservoir through the drain hole and exits the drain hole in the form of droplets, and the drain and vent holes are relatively sized so that the flow of the liquid is metered at a rate that allows the droplets to be of a sufficiently small size so as to vaporize substantially immediately once outside the drain hole.

2. The cover according to claim 1, wherein the reservoir is annular-shaped and the raised portion is surrounded by the reservoir.

3. The cover according to claim 1, wherein the drain hole is located in one of the first and second walls of the reservoir.

4. The cover according to claim 1, wherein the vent hole is located adjacent the first wall of the reservoir.

5. The cover according to claim 1, wherein the vent hole is not located at an apex of the raised portion.

6. The cover according to claim 1, wherein the cover comprises a single vent hole and multiple drain holes, the drain holes are located in one of the first and second walls of the reservoir, and the vent hole is located adjacent the first wall of the reservoir.

7. The cover according to claim 1, further comprising a grill with which the cover is adapted to form an enclosed cooking chamber.

8. The cover according to claim 1, wherein the drain hole has a sufficiently small diameter such that, in the absence of the vent hole, water will not flow therethrough.

9. A grill cover comprising:

a raised central portion;

an annular-shaped reservoir surrounding the raised central portion and near a perimeter of the cover, the reservoir having a radially inward arcuate wall, a radially outward arcuate wall, and a bottom therebetween so as to be capable of containing a liquid, the outward arcuate wall terminating in a lip that is at a lower elevation than the raised central portion such that the lip establishes an upper fill level of the reservoir;

at least one drain hole located in the inward arcuate wall of the reservoir between the bottom of the reservoir and the upper fill level of the reservoir; and at least one vent hole located in the raised central portion adjacent the inward arcuate wall of the reservoir and above the upper fill level;

wherein the drain hole is sized such that water will not flow therethrough in the absence of the vent hole, the drain and vent holes are relatively sized so that a liquid contained within the reservoir flows from the reservoir through the drain hole and exits the drain hole in the form of droplets, and the drain and vent holes are relatively sized so that the flow of the liquid is metered at a rate that allows the droplets to be of a sufficiently small size so as to vaporize substantially immediately once outside the drain hole.

10. The cover according to claim 9, wherein the vent hole is not located at an apex of the raised portion.

11. The cover according to claim 10, wherein the cover comprises a single vent hole and multiple drain holes.

12. The cover according to claim 9, further comprising a grill with which the cover is adapted to form an enclosed cooking chamber.

13. The cover according to claim 9, wherein the drain hole has a diameter of about one millimeter.

14. A method of introducing a liquid into a cooking chamber defined between a cover and a cooking container, the cover comprising a raised portion and a reservoir capable of containing a liquid, the reservoir being configured to have a maximum fill level and at least one drain hole located below the maximum fill level, the raised portion having at least one vent hole located above the maximum fill level, the method comprising the steps of:

heating the cooking chamber;

placing a liquid in the reservoir, the drain and vent holes being relatively sized so that the liquid flows from the reservoir through the drain hole and enters the cooking chamber in the form of droplets that vaporize substantially immediately so that the liquid is introduced into the cooking chamber as steam; and venting steam from the cooking chamber through the vent hole.

15. The method according to claim 14, wherein the cooking container is a grill and the cover is a grill cover.

16. The method according to claim 14, wherein the drain hole has a sufficiently small diameter such that water does not flow therethrough in the absence of heat escaping the cooking chamber through the vent hole.

17. The method according to claim 14, further comprising the step of forming the cover so that the reservoir is annular-shaped and the raised portion is surrounded by the reservoir.

18. The method according to claim 14, further comprising the step of forming the cover so that the reservoir has first and second walls and a bottom therebetween, the second wall terminates in a lip that is at a lower elevation than the raised portion and establishes the maximum fill level of the reservoir, and the drain hole is located in one of the first and second walls of the reservoir.

19. The method according to claim 18, further comprising the step of forming the vent hole adjacent the first wall of the reservoir.

20. The method according to claim 19, further comprising the step of forming the cover to have a single vent hole and multiple drain holes, the drain holes being formed in the first wall of the reservoir.

* * * * *